(12) United States Patent
Gray et al.

(10) Patent No.: US 9,134,125 B2
(45) Date of Patent: Sep. 15, 2015

(54) SELF-CENTERING WHEEL CLAMP WITH NO WHEEL CONTACT

(75) Inventors: Brian K. Gray, Conway, AR (US);
Rodney Harrell, Greenbriar, AR (US);
David A. Jackson, Point Roberts, WA (US); Ronald D. Swayne, Sherwood, AR (US); Ronald D. Edgmon, Conway, AR (US)

(73) Assignee: SNAP-ON INCORPORATED, Kenosha, WI (US)

( * ) Notice: Subject to any disclaimer, the term of this patent is extended or adjusted under 35 U.S.C. 154(b) by 160 days.

(21) Appl. No.: 13/607,191

(22) Filed: Sep. 7, 2012

(65) Prior Publication Data
US 2014/0070474 A1 Mar. 13, 2014

(51) Int. Cl.
*B25B 1/00* (2006.01)
*G01B 21/26* (2006.01)
*B25B 5/02* (2006.01)
*B25B 1/20* (2006.01)
*A43D 79/00* (2006.01)
*B25B 5/00* (2006.01)

(52) U.S. Cl.
CPC . *G01B 21/26* (2013.01); *B25B 5/02* (2013.01); *A43D 79/00* (2013.01); *B25B 1/20* (2013.01); *B25B 5/003* (2013.01); *G01B 2210/16* (2013.01)

(58) Field of Classification Search
USPC .......................................................... 269/156
See application file for complete search history.

(56) References Cited

U.S. PATENT DOCUMENTS

| | | | | |
|---|---|---|---|---|
| 1,971,702 | A | * | 8/1934 | Burgan ........................... 33/336 |
| 4,011,659 | A | * | 3/1977 | Horvallius ...................... 33/203 |
| 4,335,519 | A | * | 6/1982 | Alsina ............................. 33/288 |
| 4,377,038 | A | | 3/1983 | Ragan |
| 4,534,115 | A | * | 8/1985 | Kashubara ................. 33/203.18 |
| 4,901,560 | A | * | 2/1990 | Hirano et al. .............. 73/115.07 |
| 5,048,192 | A | * | 9/1991 | Pascoal ....................... 33/203.18 |
| 5,355,586 | A | * | 10/1994 | Fukuda et al. ............. 33/203.13 |
| 5,826,319 | A | * | 10/1998 | Colwell et al. ............. 29/407.04 |
| 5,987,761 | A | * | 11/1999 | Ohnesorge ................. 33/203.18 |
| 6,131,293 | A | * | 10/2000 | Maioli et al. .............. 33/203.18 |
| 6,708,419 | B2 | | 3/2004 | Corghi |

(Continued)

OTHER PUBLICATIONS

Search Report and Written Opinion of the International Searching Authority issued in INternational Patent Application No. PCT/US2012/054270 dated Sep. 7, 2012.

(Continued)

*Primary Examiner* — Lee D Wilson
*Assistant Examiner* — Alvin Grant
(74) *Attorney, Agent, or Firm* — McDermott Will & Emery LLP

(57) ABSTRACT

A wheel clamp attaches to a vehicle wheel for performing a wheel alignment on the vehicle. The wheel clamp has a body for supporting a target or measuring head, and three extendable arms slidably mounted to the body. Each arm has a gripping portion for gripping the tire's tread surface and a sidewall contact portion for contacting the tire sidewall such that the clamp body is substantially parallel to the vehicle wheel and the wheel clamp has no contact with the rim. A self-centering linkage has enmeshed gears and link arms respectively connecting the arms to the gears, such that when the gears are rotated, the arms simultaneously proportionally slide relative to the clamp body, so the gripping portions of the arms engage and grip the tire tread surface and tighten the clamp onto the tire, while the sidewall contact portions of the arms contact the tire sidewall.

26 Claims, 16 Drawing Sheets

(56) References Cited

U.S. PATENT DOCUMENTS

| | | | |
|---|---|---|---|
| 7,703,212 | B2 | 4/2010 | Stieff et al. |
| 7,870,677 | B2 | 1/2011 | Gray et al. |
| D636,003 | S | 4/2011 | Linson et al. |
| 7,930,834 | B2 | 4/2011 | Stieff et al. |
| 8,033,028 | B2 | 10/2011 | Stieff et al. |
| 2011/0001821 | A1 | 1/2011 | Stieff et al. |
| 2014/0115906 | A1* | 5/2014 | Pruitt et al. ............... 33/203.18 |

OTHER PUBLICATIONS

"ProClamp SYNCRO" <www.haweka.com/en/index.php?nav=5.81.126.132> Retrieved from the Internet on Oct. 17, 2012 (1 page).
"Magnetic Wheel Adapter TC-142" truckCam—Effective Driving Wheel Alignment Systems <www. truckcam.com> Retrieved from the Internet on Oct. 17, 2012 (2 pages).
"Wheel Adapter for rims 14"-24" TC-175 Spider" truckCam—Effective Driving Wheel Alignment Systems <www. truckcam.com> Retrieved from the Internet on Oct. 17, 2012 (2 pages).
"HawkEye Elite Alignment System—Greater profit and productivity through innovation" <http://www.hunter.com/alignment/hawkeye_elite/features.cfm> Retrieved from the Internet on Sep. 7, 2012.
Alignment Accessories—Hunter Engineering Company. "QuickGrip Adaptor Accesories" and Wheel-Off Adjustment Kits. pp. 3-5 (Retrieved from the Internet on Sep. 7, 2012).
HawkEye Elite HE421 Series Sensors—Hunter Engineering Company, pp. 1-3 (Copyright 2011). Retrieved from the Internet on Sep. 7, 2012.
"The unique self-centering 3-point Syncro clampers from FASEP—The secret of success, the secret of a good wheel alignment." <http://fasep.it/english/support/tech_talks/tt015_self_centering_clampers.asp> Retrieved from the Internet on Sep. 7, 2012.
"Beissbarth KDS 3D wheel aligner" <http://www.beissbarth.com/tryit/index.php?ID=2&SUB1=164&LG=E&CS=1> Retrieved from the Internet on Sep. 7, 2012.
"ProClamp PLUS" <http://hawkeka.com/en/index.php?nav=5.81.126.245> Retrieved from the Internet on Jul. 16, 2012 (3 pages).
"Atlas Fast Clamp Three Point 13"-24" Non-Runout Wheel Clamps (Set of 4)" <http://www.gregsmithequipment.com/Atlas-Fast-Clamp-Three-Poi nt-13-24-Non-Runout-Wheel-Clamps-Set-Of-4> Retrieved from the Internet on Sep. 6, 2012.
"Atlas Fastclamp Wheel Clamps" <http://www.atlasautoequipment.com/products/fastclamp>. Retrieved from the Internet on Sep. 6, 2012.
CARTEK—A Heritage of Excellence 2011-Equipment Catalog, pp. 6-8.
"The World's First Bluetooth Truck Alignment System" Ravaglioli HD, 5 pages (Apr. 1, 2012).
"TD2200WS (8CCD) Bluetooth" Ravaglioli, 4 pages (Mar. 1, 2012).
"TD1760WS (6CCD) Bluetooth Series" Ravaglioli, 4 pages (Mar. 1, 2011).
Chinese First Official Notification, w/ English translation thereof, issued in Chinese Filing No. 2013205577618 dated Dec. 20, 2013.
International Preliminary Report on Patentability and Written Opinion of the International Searching Authority PCT/US2012/054270 dated Mar. 19, 2015.

* cited by examiner

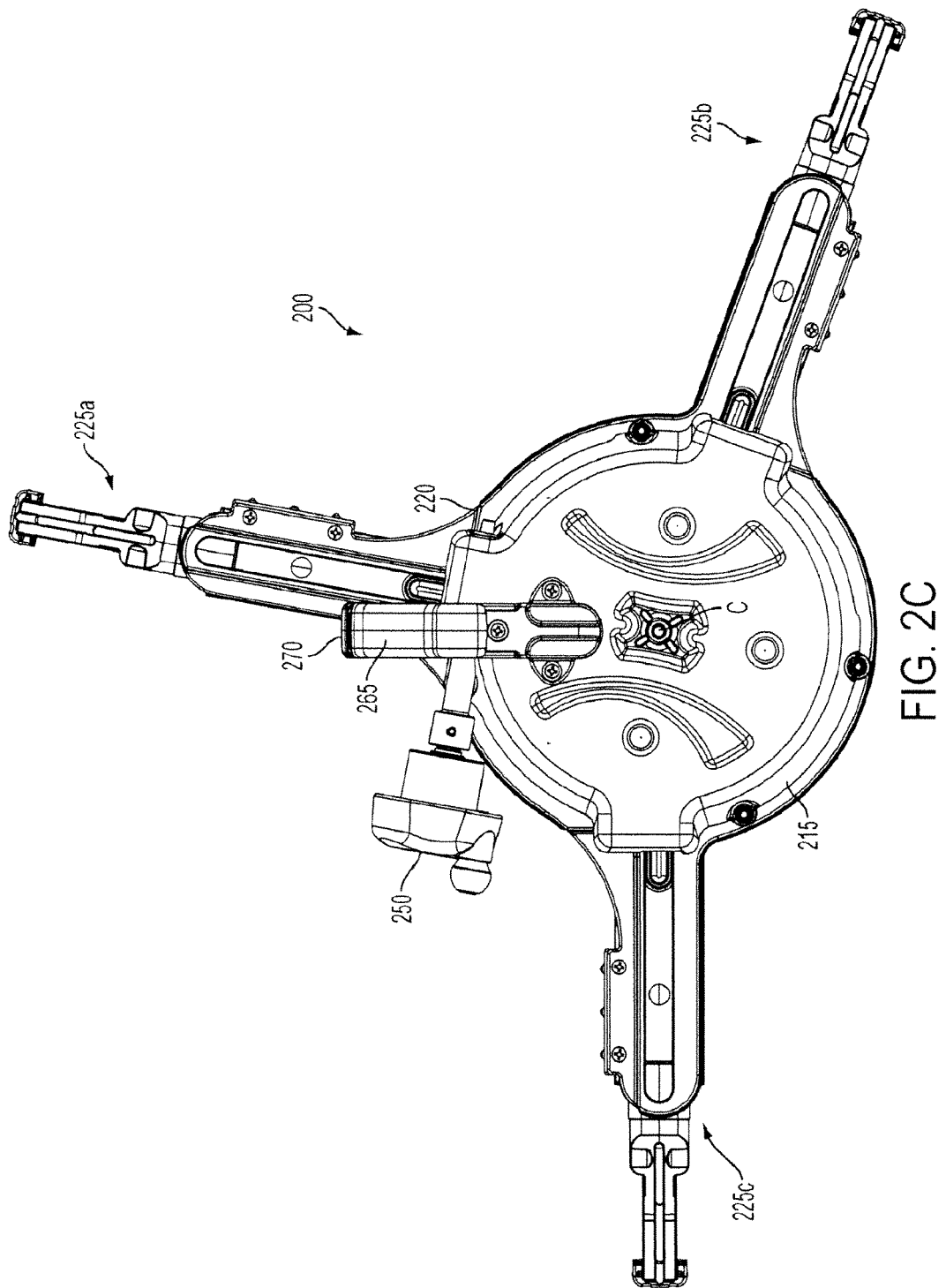

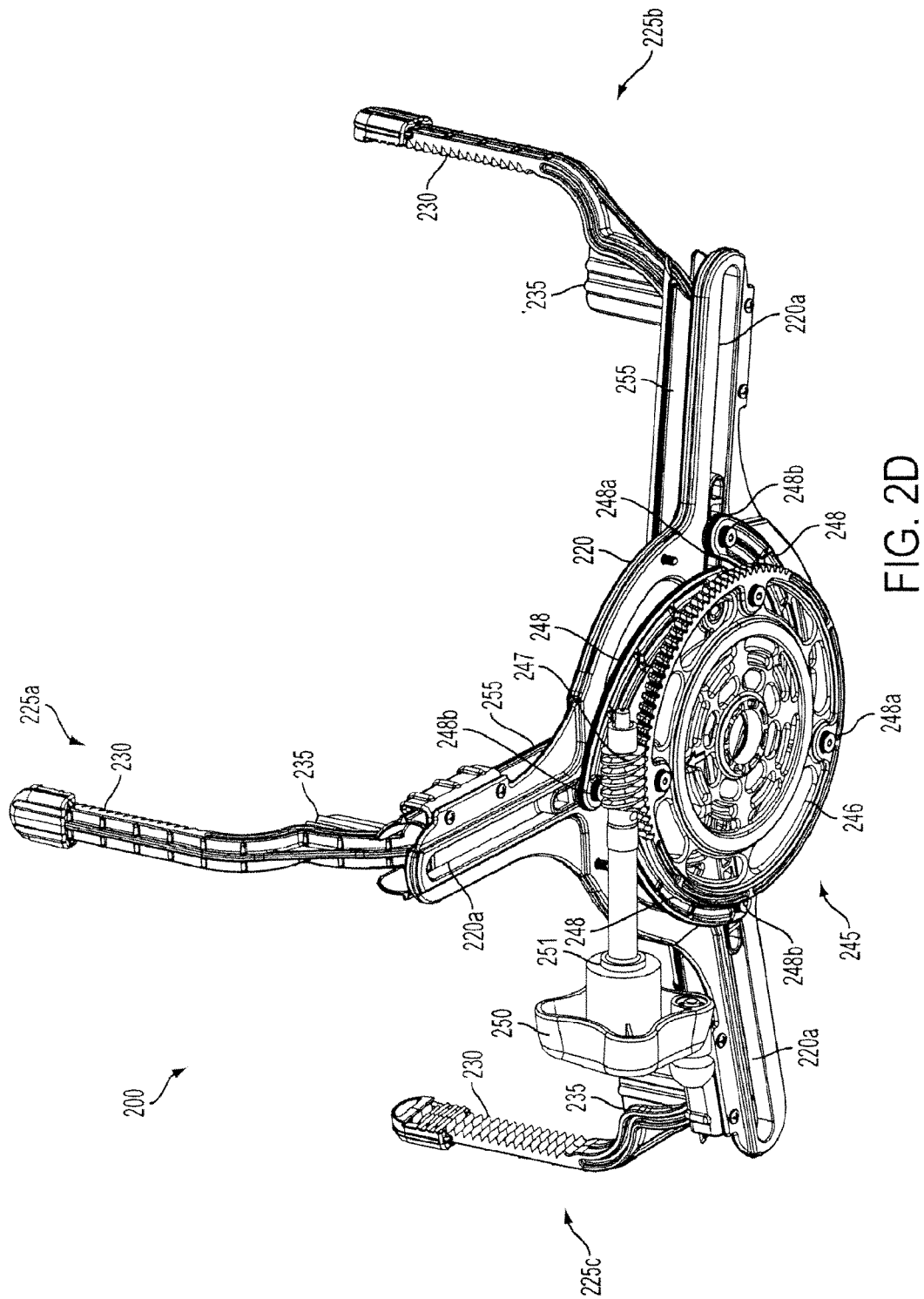

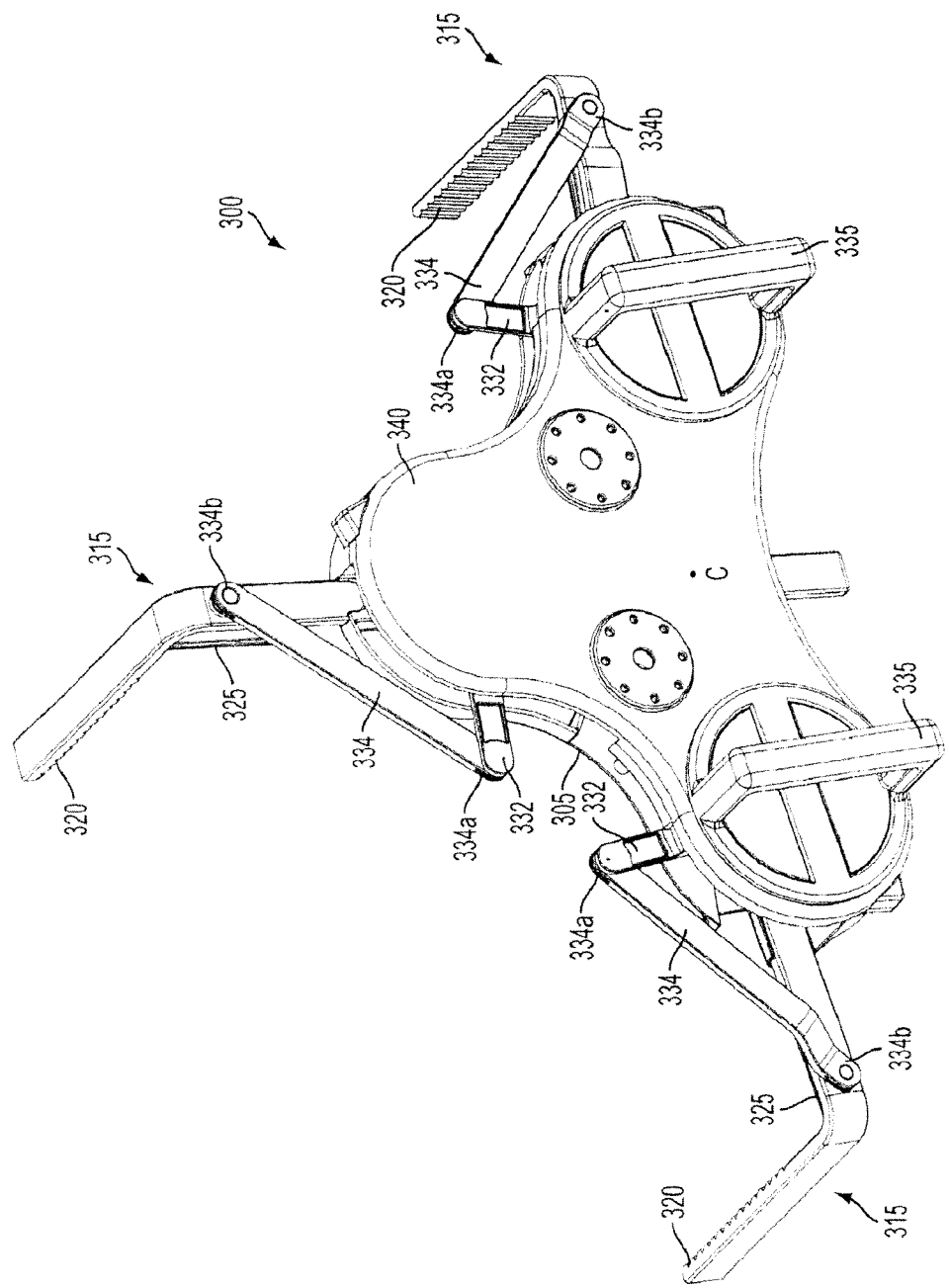

SELF-CENTERING WHEEL CLAMP WITH NO WHEEL CONTACT

TECHNICAL FIELD

The present subject matter relates to equipment for aligning vehicle wheels. It has particular applicability to wheel clamps for attaching wheel alignment equipment to the wheels.

BACKGROUND

Certain conventional vehicle wheel alignment systems use alignment elements referred to as "alignment heads" that are attached to the wheels of a vehicle to measure various angles of the wheels and suspension. These angles are communicated to a host computer system, where they are used in the calculation of vehicle alignment angles. In a standard conventional aligner configuration, four alignment heads are attached to respective wheels of a vehicle. Each alignment head comprises two horizontal or toe measurement sensors and two vertical or camber/pitch sensors. Each alignment head also contains electronics to support overall sensor data acquisition as well as communications with the aligner console, local user input, and local display for status feedback, diagnostics and calibration support. Other conventional alignment systems, referred to as "visual aligners," use optical targets attached to each vehicle wheel instead of sensors. The targets are imaged by cameras, and these visual images are used to calculate the vehicle wheel alignment angles.

Such alignment equipment usually includes a wheel clamp that attaches to a vehicle's wheel and carries the alignment element (i.e., the sensor equipment that measures the alignment angles, or the optical target). Referring now to FIG. 1, a conventional wheel clamp 100, such as described in U.S. Pat. No. 7,870,677, includes a pair of upper and lower sliding brackets 105, 110, respectively, for engaging the rim of the vehicle wheel, and a center bracket 115 for holding an alignment element, such as an optical target or an alignment head. Brackets 105, 110, 155 are all slidably mounted on a pair of guide bars 120, 125. A lead screw 130 threadingly engages upper and lower brackets 105, 110 for clamping the clamp 100 to the vehicle wheel. The vehicle being aligned is usually positioned on a vehicle alignment lift at heights from three to four feet for performing alignments. The vehicle can be raised even higher, up to six feet, for servicing the vehicle from underneath.

Attachment of the wheel clamp to the vehicle wheel is typically accomplished using a set of three or more gripping devices or grabbers which are part of the wheel clamp. The grabbers wedge thin metal fingers in the annular groove between the tire and the wheel rim at several locations around the wheel circumference. The grip is tightened by means of a screw thread driver or similar means that pulls the grabbers toward the wheel center. In an alternative methodology, used particularly on steel wheels, the grabbers are removed and the grabber supports are located against the inner surface of the steel wheel. The grabber supports are driven outward from the wheel center until they lock the wheel clamp in place. Either method requires metal to metal contact between the wheel clamp and the vehicle wheel rim, so some damage to the surface of the wheel is inevitable.

Speed of attachment is another critical aspect of wheel clamp functionality. Aligning the metal fingers of conventional wheel clamps into the small annular space between the wheel rim and tire is a challenge that requires precise placement. Once the grabbers are positioned properly, care must be taken to prevent one or more grabbers from popping out as the clamp is tightened. This process takes considerable time and care to prevent unnecessary damage to the rim surface.

Since tires and rims come in a wide variety of sizes, it is useful to have a single wheel clamp that will address the extremities of the size range without the need for additional, nonintegral adaptors or extensions.

Other wheel clamp designs that attempt to solve rim damage problems exist. For example, the Beissbarth Magnetic Wheel Lug Clamp attempts to mitigate rim damage by using adjustable magnets placed in contact with vehicle wheel lug nuts as a means of securing the wheel clamp in place. Since many vehicles have lug nuts covered by a cosmetic wheel cover or hub cap, the need to remove the wheel cover is a distinct disadvantage. In addition, the adjustment required to various lug nut patterns can be tedious and slow. A recent design described in U.S. Patent Application Publication 2011/0001821 incorporates a method of gripping the tire tread with two cam operated arms while pressing a plastic annular ring against the rim surface for support. This design does not self center, and still has a potential for rim surface damage. Moreover, multiple, nonintegral arms are needed to allow functionality with all possible rim diameters.

Therefore, a need exists for a wheel clamp that does not touch any part of the vehicle wheel surface, provides secure mounting with an emphasis on speed and ease of use, covers a wide range of wheel diameters without the need for additional nonintegral apparatus, and centers automatically on the vehicle wheel centerline as the clamp is tightened.

SUMMARY

The concepts disclosed herein alleviate the above noted problems with conventional wheel clamps.

According to the present disclosure, a wheel clamp is for attaching to a vehicle wheel for performing a wheel alignment on the vehicle, the wheel comprising a tire and a rim. The wheel clamp comprises a clamp body for supporting an apparatus used in performing the wheel alignment and three extendable arms, each slidably mounted to the clamp body such that they extend outward radially from a central point. Each extendable arm has a gripping portion for gripping a tread surface of the vehicle tire and a sidewall contact portion for contacting a sidewall of the tire when the gripping portion is gripping the tire tread surface. The clamp further comprises a self-centering linkage mechanism comprising a plurality of gears rotatably mounted to the clamp body and engaged with each other, and a plurality of link arms, each link arm movably connecting one of the extendable arms to one of the gears such that when the gears are rotated, the extendable arms simultaneously proportionally slide relative to the clamp body. The linkage mechanism is for moving the extendable arms such that the gripping portions of the extendible arms engage and grip the tire tread surface and tighten the clamp onto the tire, while the sidewall contact portions of the extendible arms contact the tire sidewall. The extendable arms are for spacing the wheel clamp away from the wheel rim when the gripping portions are gripping the tire tread surface and the sidewall contact portions are contacting the tire sidewall, such that the clamp body is substantially parallel to the vehicle wheel and the wheel clamp has no contact with the rim.

According to another aspect of the present disclosure, a wheel clamp comprises a clamp body and three elongated arms, each arm having a proximal end pivotally mounted to the clamp body such that the arm extends outward from the clamp body, each arm having a distal end with a gripping portion for gripping a tread surface of the vehicle tire and a sidewall contact portion for contacting a sidewall of the tire when the gripping portion is gripping the tire tread surface. The clamp further comprises a self-centering mechanism having an arm gear attached to the proximal end of each of the arms coaxial with the pivot point of each respective arm, and a central connecting gear engaged with all the arm gears for synchronizing the movement of each arm with respect to the other arms, such that when any of the gears are rotated, all the arms simultaneously proportionally pivot relative to the clamp body. The self-centering mechanism is for moving the arms such that the gripping portions of the arms engage and grip the tire tread surface and tighten the clamp onto the tire, while the sidewall contact portions of the arms contact the tire sidewall. The arms are for spacing the wheel clamp away from the wheel rim when the gripping portions are gripping the tire tread surface and the sidewall contact portions are contacting the tire sidewall, such that the clamp body is substantially parallel to the vehicle wheel and the wheel clamp has no contact with the rim.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIGS. 2B, 2C, and 2E are external views of the wheel clamp of FIG. 2A.

FIGS. 2D and 2F are cutaway views of the wheel clamp of FIG. 2A.

FIGS. 3A and 3B are external views of a wheel clamp according to another embodiment of the present disclosure.

DETAILED DESCRIPTION

Reference now is made in detail to the examples illustrated in the accompanying drawings and discussed below. FIGS. 2A-2H illustrate an embodiment of a wheel clamp according to the present disclosure for attaching to a vehicle wheel for performing a wheel alignment on the vehicle. According to this embodiment, the wheel clamp includes three extendable arms with gripping devices at the extremity of each arm, for gripping the vehicle tire tread surface when the arms are pulled inward using a manually rotating worm gear rotating in a first direction while engaging an orbital gear with pivotable and slidable linkages to each of the three arms. An important advantage of the worm gear is its nature to lock in place when tightened, ensuring a secure grip on the tire is maintained without additional locking elements. In certain embodiments, an automatic clutch mechanism is provided to allow only a predetermined maximum torque on the worm gear as the clamp is tightened. This provides consistent clamp tightness across all four clamps used on a typical vehicle application, ensures that all clamps are stable and secure, and minimizes target position variation due to tire deformation caused by clamp tightness variation. The gripping devices are disengaged from the tire tread surface by rotating the handle attached to the worm gear in a second and opposite direction.

Figure 1:
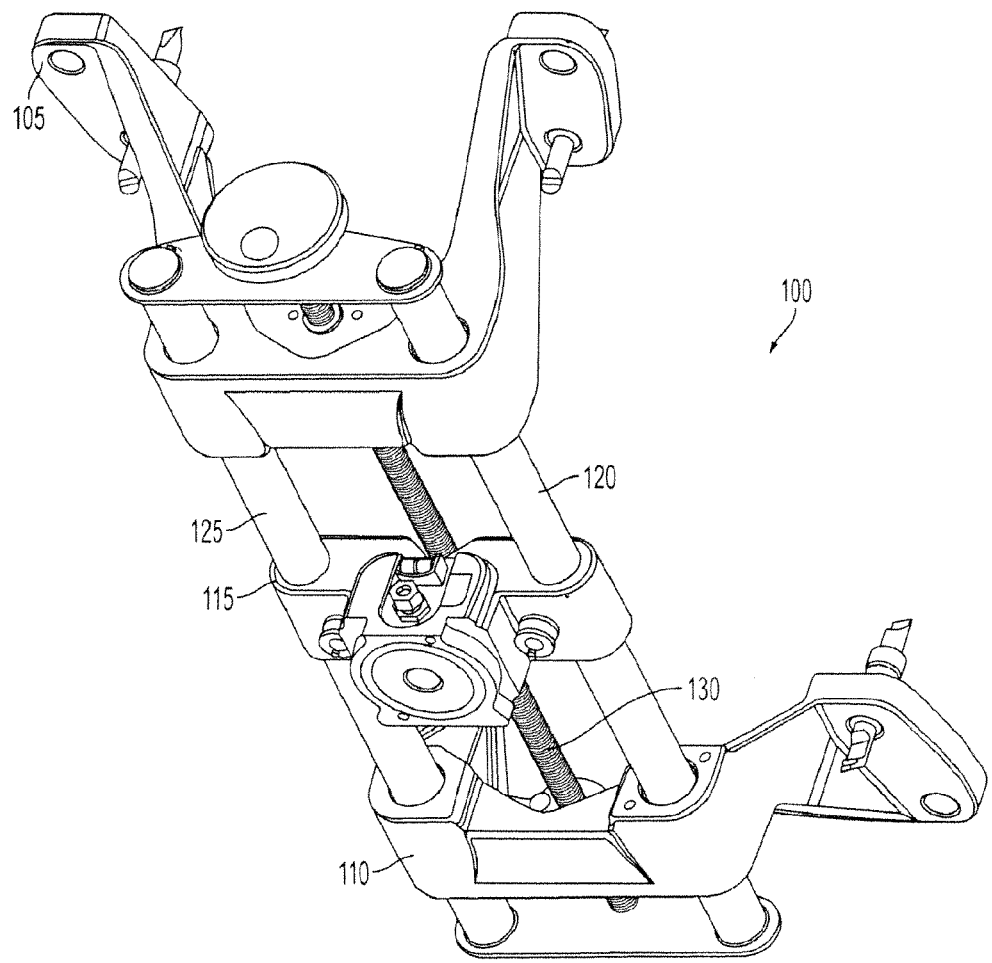
FIG. 1 is a prior art wheel clamp.
Figure 2A:
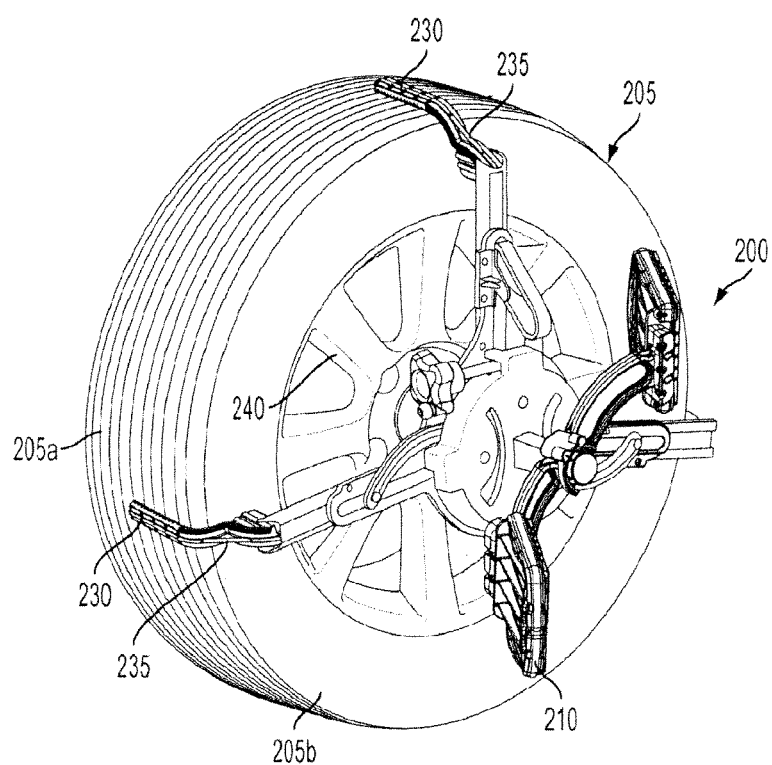
FIG. 2A is wheel clamp according to an embodiment of the present disclosure mounted on a vehicle wheel.

FIG. 2A shows a clamp assembly 200 according to this embodiment mounted on a vehicle tire 205, while not touching the rim 240 on which the tire 205 is mounted. As used herein, the term "vehicle wheel" refers to the combination of tire 205 and rim 240. An exemplary optical target 210 is shown attached to the clamp 200, which target 210 is used in performing a wheel alignment.

Figure 2B:
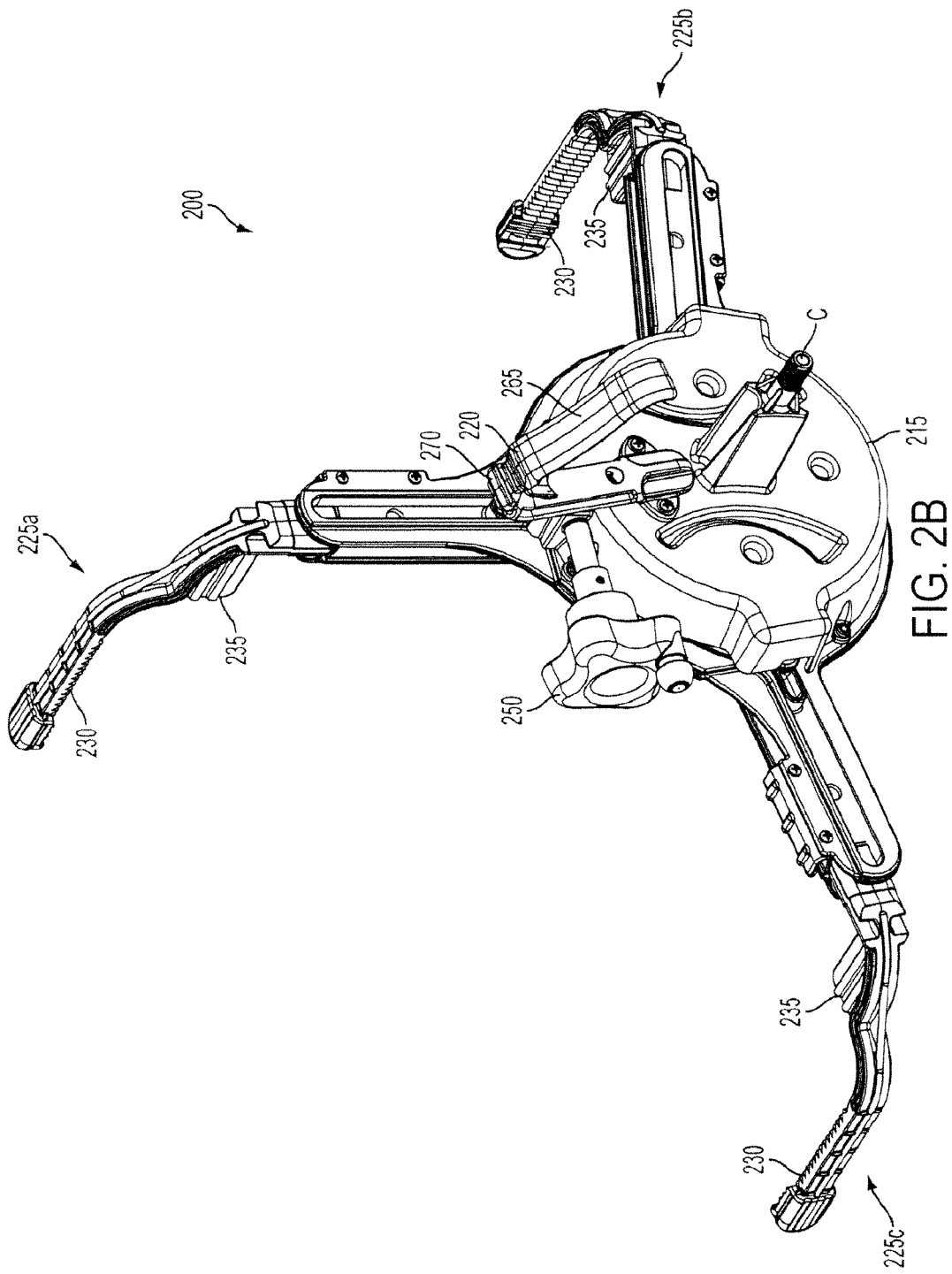

The disclosed clamp 200 of this embodiment is shown without a target in FIGS. 2B and 2C including a gear cover 215 used to protect the gears and linkages. FIG. 2D shows the clamp 200 without the gear cover 215. The wheel clamp 200 comprises a clamp body 220 for supporting an apparatus used in performing the wheel alignment. For example, the clamp body 220 of FIGS. 2A-F includes gear cover 215 for supporting the target 210 at a central point C.

Three extendable arms 225a-c, each slidably mounted to the clamp body 220, extend outward radially from the central point C. Each extendable arm 225a-c has a gripping portion 230 for gripping a tread surface 205a of the vehicle tire 205, and a sidewall contact portion 235 for contacting a sidewall 205b of the tire 205 when the gripping portion 230 is gripping the tire tread surface 205a. The extendable arms 225a-c are for spacing the wheel clamp 200 away from the wheel rim 240 when the gripping portions 230 are gripping the tire tread surface 205a and the sidewall contact portions 235 are contacting the tire sidewall 205b, such that the clamp body 220 is substantially parallel to the vehicle wheel and the wheel clamp 200 has no contact with the rim 240. A first one of the extendible arms 225b is spaced more than 90 degrees clockwise from a second one 225a of the extendible arms, and a third one of the extendible arms 225c is spaced more than 90 degrees counterclockwise from the second one of the extendible arms 225a.

A self-centering linkage mechanism 245 (see FIG. 2D) is provided so that the apparatus (such as optical target 210) mounted on the clamp 200 remains centered on the vehicle spindle across the range of tire diameters encountered. The mechanism 245 comprises a plurality of gears rotatably mounted to the clamp body 220 and engaged with each other. In this embodiment, the linkage mechanism 245 comprises an orbital gear 246 rotatably mounted to the clamp body 220, and a manually rotatable worm gear 247 engaged with the orbital gear 246 for rotating the orbital gear 246. Linkage mechanism 245 further includes a plurality of link arms 248. Each link arm 248 movably connects one of the extendable arms 225a-c to the orbital gear 246 such that when the gears 246, 247 are rotated, the extendable arms 225a-c simultaneously proportionally slide relative to the clamp body 220. The linkage mechanism 245 is for moving the extendable arms 225a-c such that the gripping portions 230 of the extendible arms 225a-c engage and grip the tire tread surface 205a and tighten the clamp onto the tire 205, while the sidewall contact portions 235 of the extendible arms 225a-c contact the tire sidewall 205b.

Each link arm 248 has a first end 248a pivotably attached to the orbital gear 246 and a second end 248b pivotably attached to one of the extendible arms 250a-c such that when the orbital gear 246 is rotated by the worm gear 247, the link arm 248 cause the extendible arms 225a-c to slide relative to the clamp body 220. A knob 250 is attached to the worm gear 247 for manually rotating the worm gear 247, and a clutch 251 between the knob 250 and the worm gear 247 limits a torque applied to the worm gear 247 to a predetermined maximum torque when the wheel clamp 200 is tightened onto the tire 205. The linkage mechanism 245 simultaneously maintains proportional movement of each arm 250a-c as the worm gear 247 is manually operated using the knob 250.

Figure 2E:
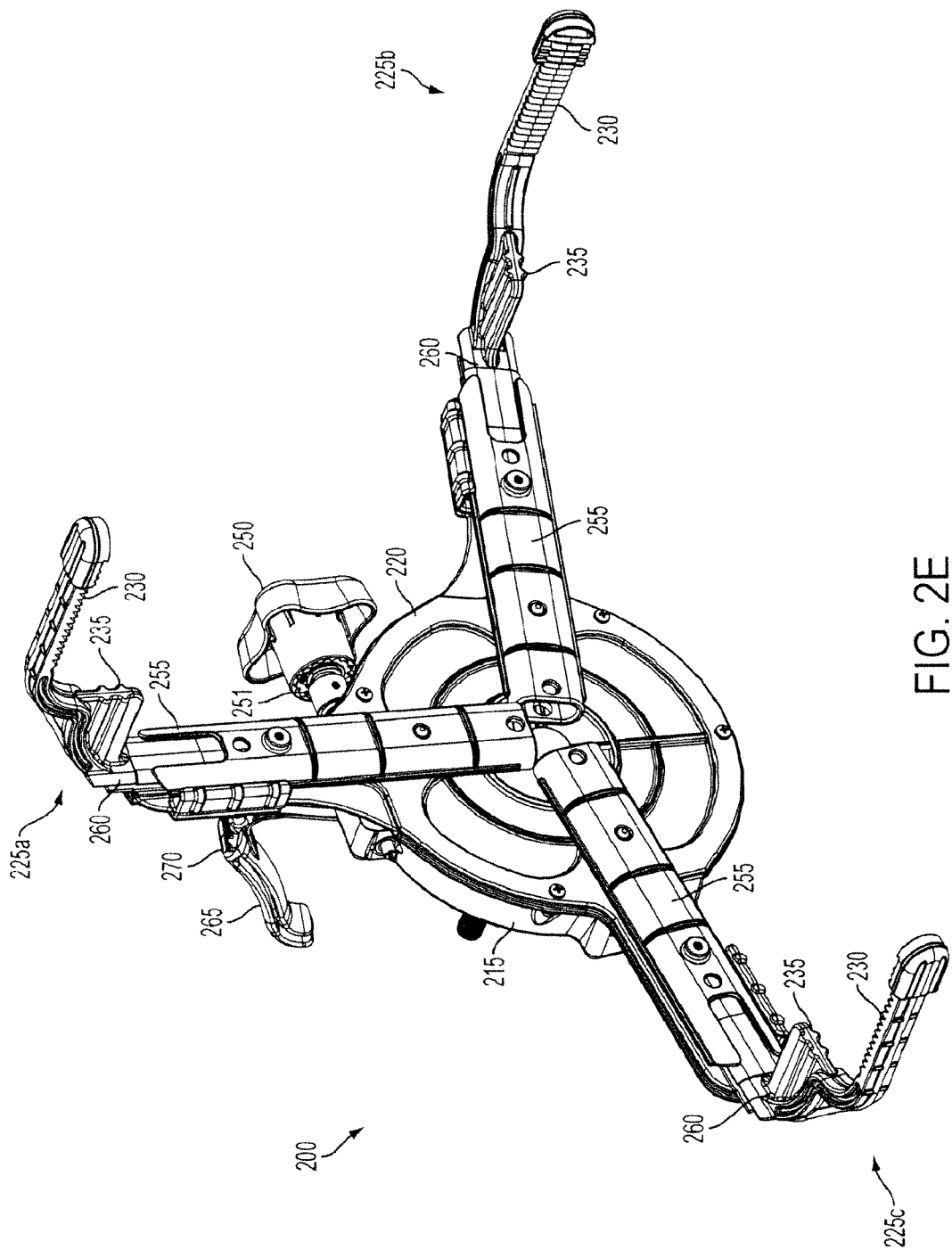
Figure 2F:
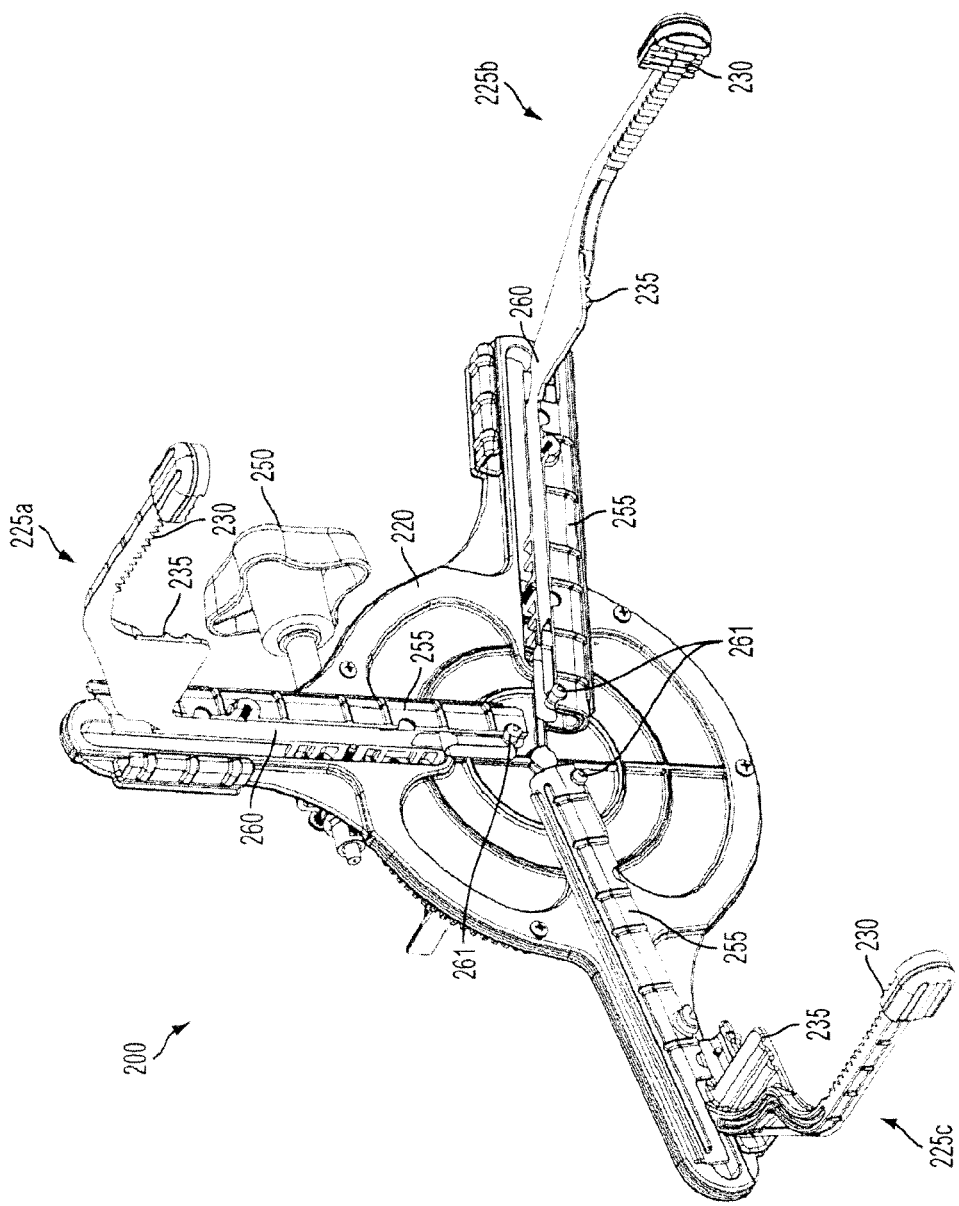
Figure 2G:
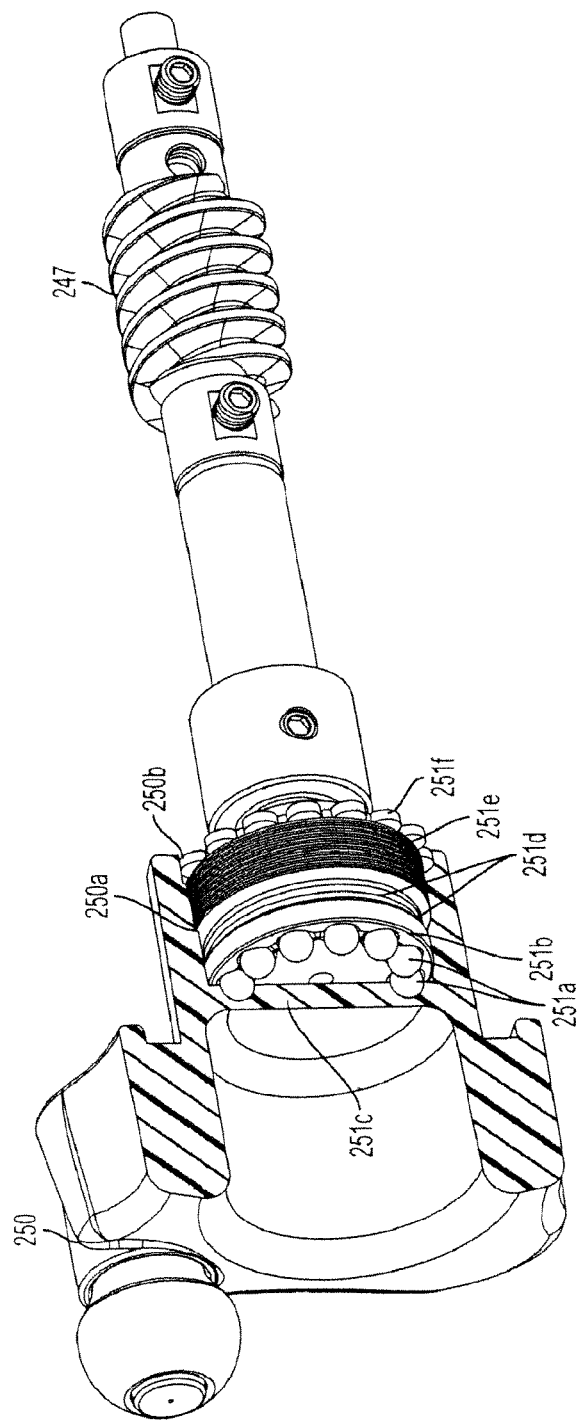
FIG. 2G is a cutaway view of a clutch mechanism of the wheel clamp of FIG. 2A.
Figure 2H:
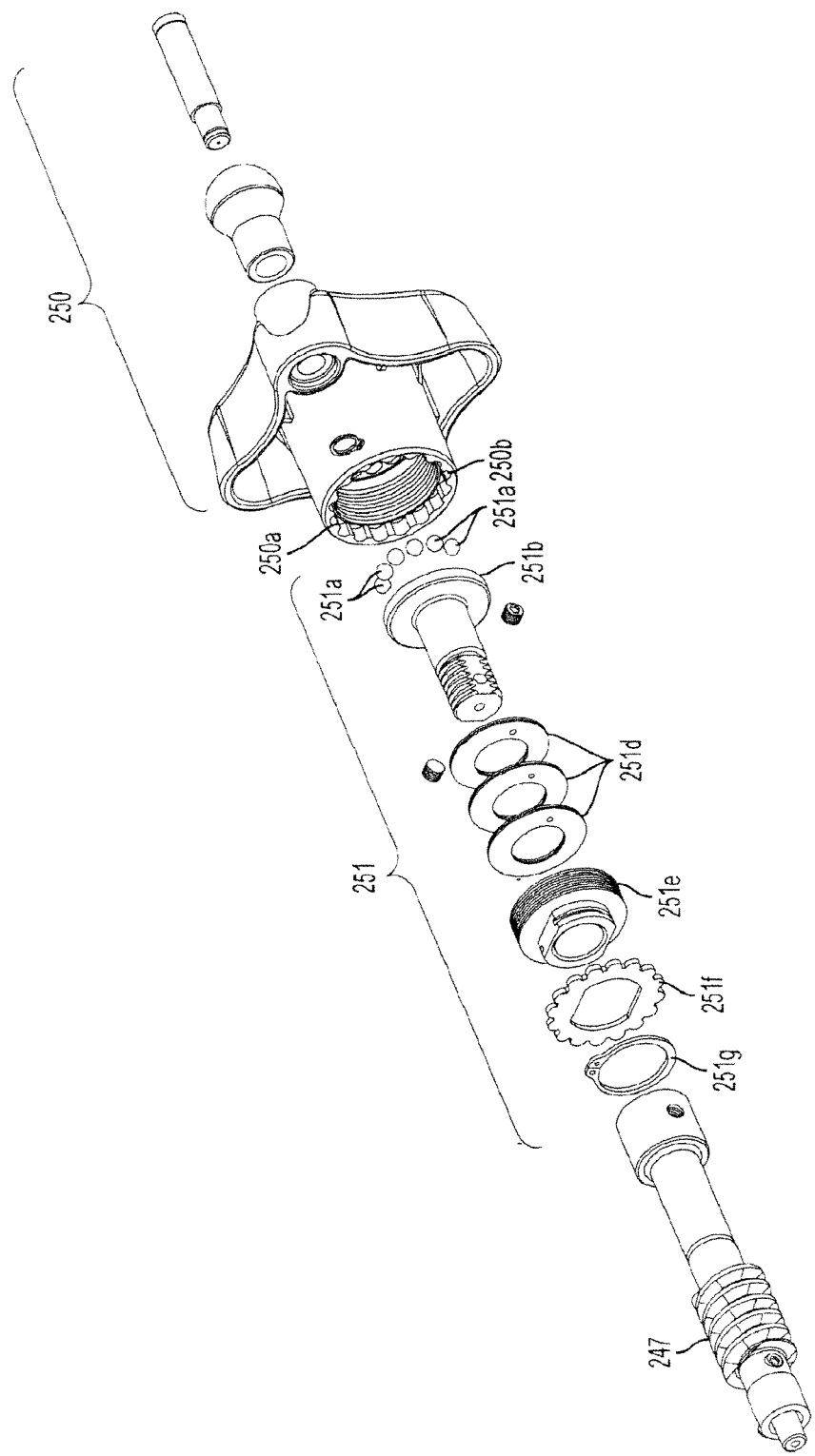
FIG. 2H is an exploded view of the clutch mechanism of FIG. 2G.

Details of a well-known mechanism to implement the clutch 251 are shown in FIGS. 2G and 2H. Those skilled in the art will appreciate that other conventional clutch mechanisms are also usable. A plurality of balls 251a, such as plastic balls, are captured between two plates 251b, 251c with hemispherical indentions in each. The number of indentions in each plate 251b, 251c is equal to the number of balls 251a. The two plates 251b, 251c are held together under an adjustable preset load using a set of wave washers 251d. The knob handle 250 has internal threads 250a that engage with an externally threaded part 251e that applies pressure to the wave washers 251d as it is threaded into the knob 250 during the assembly process. When the desired pressure is reached as measured with a torque wrench (not shown), a star washer 251f is pressed into the knob 250 to engage with a mating star cutout 250b in the knob 250, and a snap ring 251g holds the assembly together.

Once assembled, the knob 250 can be used to tighten the clamp 200 onto the tire 205 until the preload on the two plates 251b, 251c holding the balls 251a in place is overcome. The wave washers 251d will then depress slightly, allowing the plates 251b, 251c to slip to the next ball position while emitting an audible "click," indicating the predetermined maximum torque has been reached.

Note that since the clamp 200 and/or the target 210 are not symmetrical (due to the worm gear/knob assembly, shape of the target, etc.), in certain embodiments "left hand" and "right hand" clamps are provided that are mirror images of each other. The left hand clamp assembly is for attachment to a wheel on the left side of the vehicle, and vice versa. Using left and right hand clamps, all the targets can be oriented the proper way without interference from parts of the clamp 200.

To enable the clamp 200 to be quickly attachable to the vehicle wheel given the wide range of vehicle tire outside diameters, it is not optimal to use the worm/orbital gear travel to account for the potential range of movement required. It is also undesirable to use a plurality of different length arms with the attendant problems of attaching/detaching and storage of multiple separate parts. This problem is solved in the present disclosure by providing the extendible arms 225a-c with arm supports 255 as shown in FIGS. 2E-F designed to be driven by the linkages 248 attached to the orbital gear 246, and main arms 260 slidably positioned within each arm support 255. The main arms 260 are locked in one of multiple positions along the arm support 255. Each main arm 260 must be locked in a similar relative position along the length of each arm support 255 to maintain the self-centering feature of the clamp.

As shown in detail in FIGS. 2D-F, the clamp body 220 has a plurality of slots 220a, and the second ends 248b of the link arms 248 respectively engage and slide in the slots 220a. Each of the extendible arms 225a comprises one of the arm supports 255 slidably mounted to the clamp body 220 and movably attached to one of the link arms 248; and one of the main arms 260 including the gripping portion 230 and the sidewall contact portion 235 is adjustably mounted to the arm support 255 for adjusting a length of the extendible arm. The main arm 260 is slidably mounted to the arm support 255 in a telescoping manner, and further comprises a lock for maintaining a position of the main arm 260 relative to the arm support 255. The lock comprises, for example, a conventional ball detent mechanism 261 including a spring-loaded ball between the main arm 260 and the arm support 255.

Referring again to FIGS. 2B-C, the wheel clamp 200 further comprises a handle 265 attached to the clamp body 220 for gripping by a user for holding the clamp 200 while the worm gear 247 is manually rotated via knob 250. The handle 265 comprises a level indicator 270, such as a bubble level, for indicating when the handle 265 is vertical. As best seen in FIG. 2C, the handle 265 is substantially vertical when gripped by a user. One of the extendible arms 225a is proximal the handle (e.g., about 10 degrees offset), and each of two other of the extendible arms 225b,c are offset more than 90 degrees from the one of the extendible arms 225a, measured relative to the central point C; for example, up to 120 degrees. The advantages of this arrangement are explained immediately below.

During a typical wheel alignment procedure, it is necessary to roll the vehicle through an angular displacement of up to 40 degrees in a process known as rollback. Further, it is known that the tire is deformed by the weight of the vehicle in the area where the outside diameter contacts the supporting surface. If the tire 205 is rotated 40 degrees from the position shown in FIG. 2A, the clamp extendible arms 225b-c can be close enough to the tire bulge where the tire contacts the supporting surface to cause a small but undesirable change in the position of the clamp and target assembly.

To prevent this, two options are available. While it is common to do rollback by rolling the vehicle wheels through a 40 degree rotation in one direction and then back to the original position, it is also possible to perform a "split rollback" procedure. Split rollback involves rolling the vehicle wheels, for example, 20 degrees in one direction, then 40 degrees in the opposite direction and then 20 degrees in the original direction back to the start position. Utilizing this procedure will keep the gripping portions of the extendible arms from getting near the tire contact area during rotation.

Alternatively, the clamp shown in FIG. 2C can be used so that the handle 265 is a vertical reference. Since the extendible arms 225a-c are offset by an angle; e.g., 10 degrees counterclockwise, the vehicle wheel can be rotated 40 degrees clockwise and the gripping portions 230 of the clamp 200 will not enter the tire deformation zone.

In another embodiment of the disclosed wheel clamp as shown in FIG. 3A-3E, three similarly sized drive gears transmit rotation to three crank arms pivotally connected to extendible arms that move slidably as restrained by the gear housing. Internal connecting gears transmit rotation of any drive gear such that the motion of all the drive gears is synchronized. Handles are fixed to two of the drive gears to allow an operator to rotate the drive gears and either expand or contract the extendible arms.

To provide a secure mounting when the clamp is tightened on the tire, a system is integrated into the drive gear handles that allows the handles to rotate freely as the gripper arms are moved inward but locks securely to prevent unintended loosening of the gripper arms when the handles are released. In one embodiment, the handle is fixed to the drive gear and a ratchet ring is movably connected to the handle such that it is spring loaded to engage mating ratchet teeth on the surface of the top housing. As the handles are rotated to pull the gripper arms inward, the user holds the ratchet ring away from the mating teeth on the top housing. When the user releases the handle, the ratchet ring drops down to engage the ratchet teeth on the top housing and the drive gears are locked.

Figure 3A:
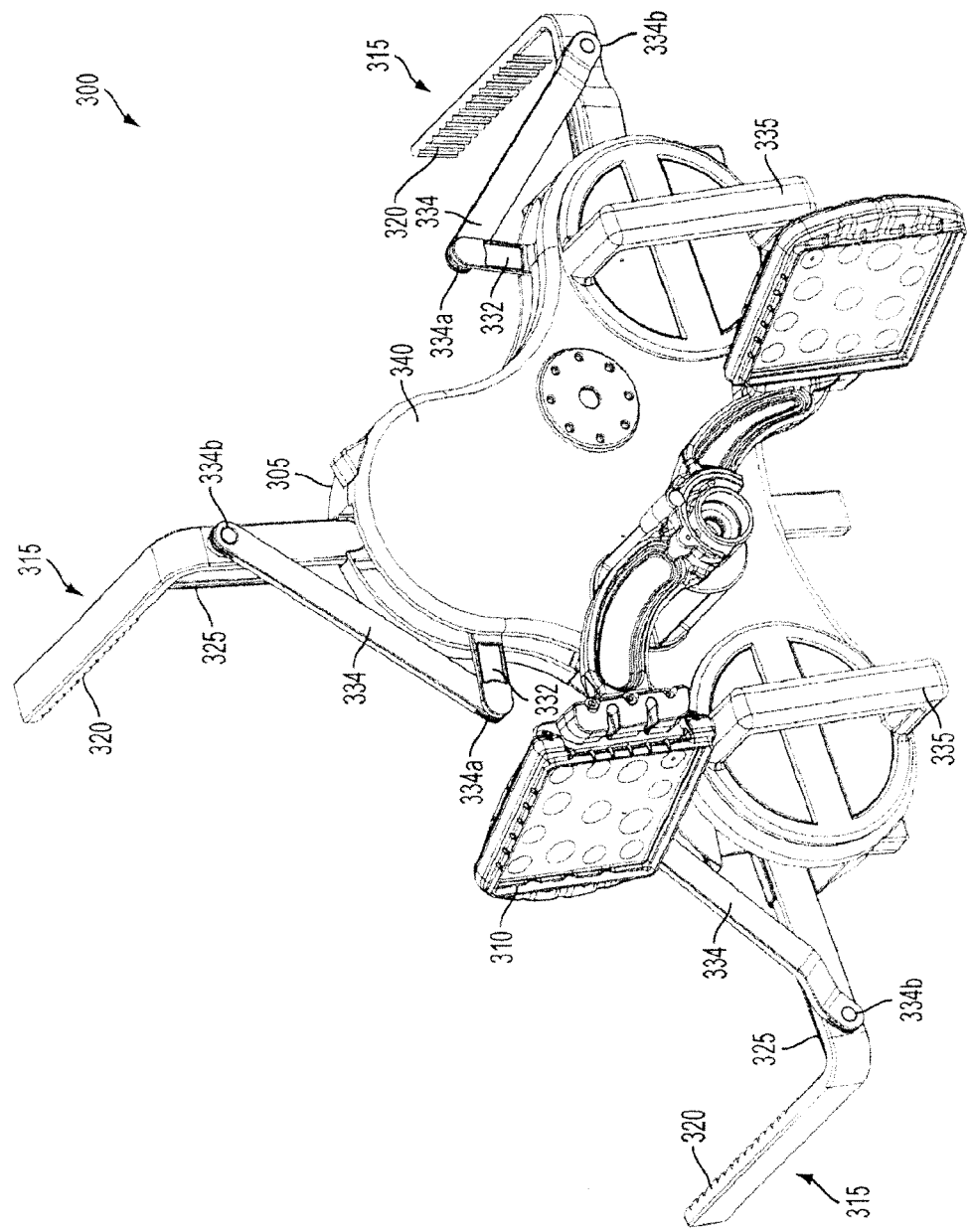
Figure 3C:
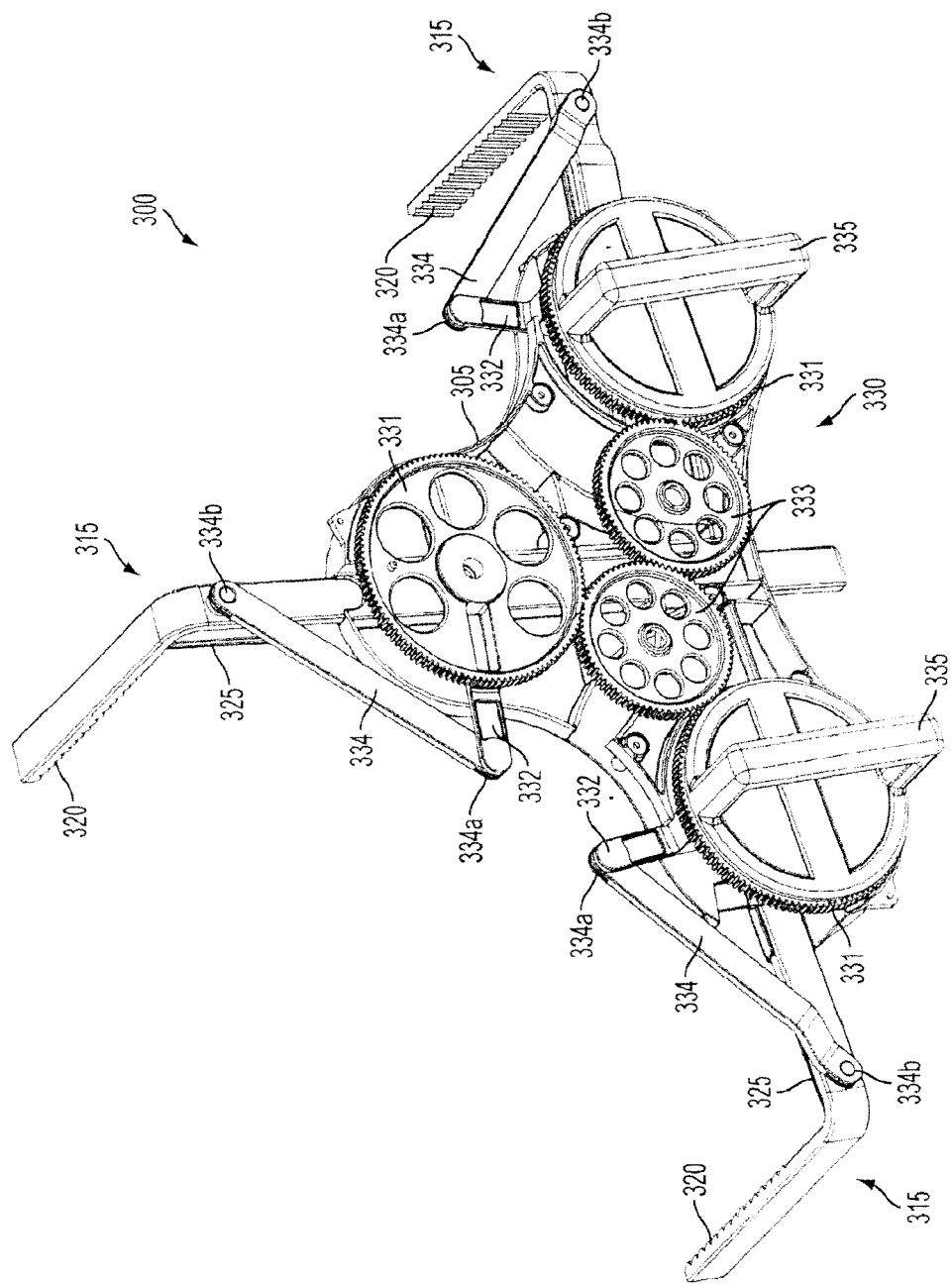
FIGS. 3C-3E are cutaway views of the wheel clamp of FIGS. 3A-B.

Referring now to FIGS. 3A-C, a wheel clamp 300 according to this embodiment includes a clamp body 305 for supporting an apparatus used in performing a wheel alignment, such as an optical target 310. Clamp 300 is for mounting on a tire such as tire 205 shown in FIG. 2A. Three extendable arms 315 are each slidably mounted to the clamp body 305 such that they extend outward radially from a central point C, each extendable arm 315 having a gripping portion 320 for gripping the tread surface 205a of the vehicle tire 205 and a sidewall contact portion 325 for contacting the sidewall 205b of the tire 205 when the gripping portion 320 is gripping the tire tread surface 205a. As in the embodiment of FIGS. 2A-F, the extendable arms 315 are for spacing the wheel clamp 300 away from the wheel rim 240 when the gripping portions 320 are gripping the tire tread surface 205a and the sidewall contact portions 325 are contacting the tire sidewall 205b, such that the clamp body 305 is substantially parallel to the vehicle wheel and the wheel clamp 300 has no contact with the rim 240.

A self-centering linkage mechanism 330 (see FIG. 3C) comprises three drive gears 331 rotatably mounted to the clamp body 305, each drive gear 331 associated with one of the extendible arms 315 and including a crank arm 332. A connecting gear train including two gears 333 rotatably mounted to the clamp body 305 engages all of the drive gears 331 for synchronizing motion of the drive gears 331. A pair of handles 335 is attached to two of the drive gears 331 for manually rotating the drive gears 331. The linkage mechanism 330 further includes a plurality of link arms 334. Each link arm 334 has a first end 334a pivotably attached to an end of the crank arm 332 of one of the drive gears 331, and a second end 334b pivotably attached to one of the extendable arms 315, such that when the drive gears 331 are rotated, the link arms 334 cause the extendible arms 315 to slide relative to the clamp body 305.

Thus, each link arm 334 movably connects one of the extendable arms 315 to one of the gears 331 such that when the gears 331 are rotated, the extendable arms 315 simultaneously proportionally slide relative to the clamp body 305. The linkage mechanism 330 thereby moves the extendable arms 315 such that the gripping portions 320 of the extendible arms 315 engage and grip the tire tread surface 205a and tighten the clamp 300 onto the tire 205, while the sidewall contact portions 325 of the extendible arms 315 contact the tire sidewall 205b.

Figure 3D:
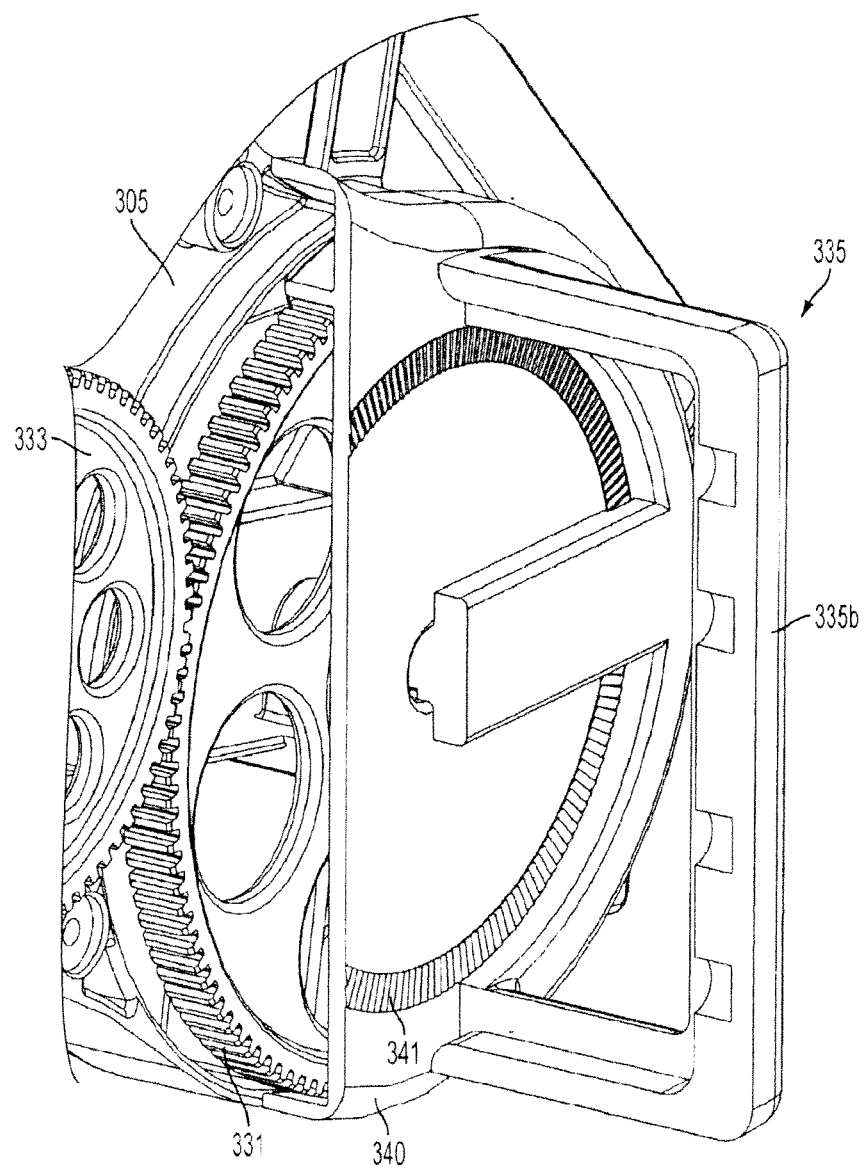
Figure 3E:
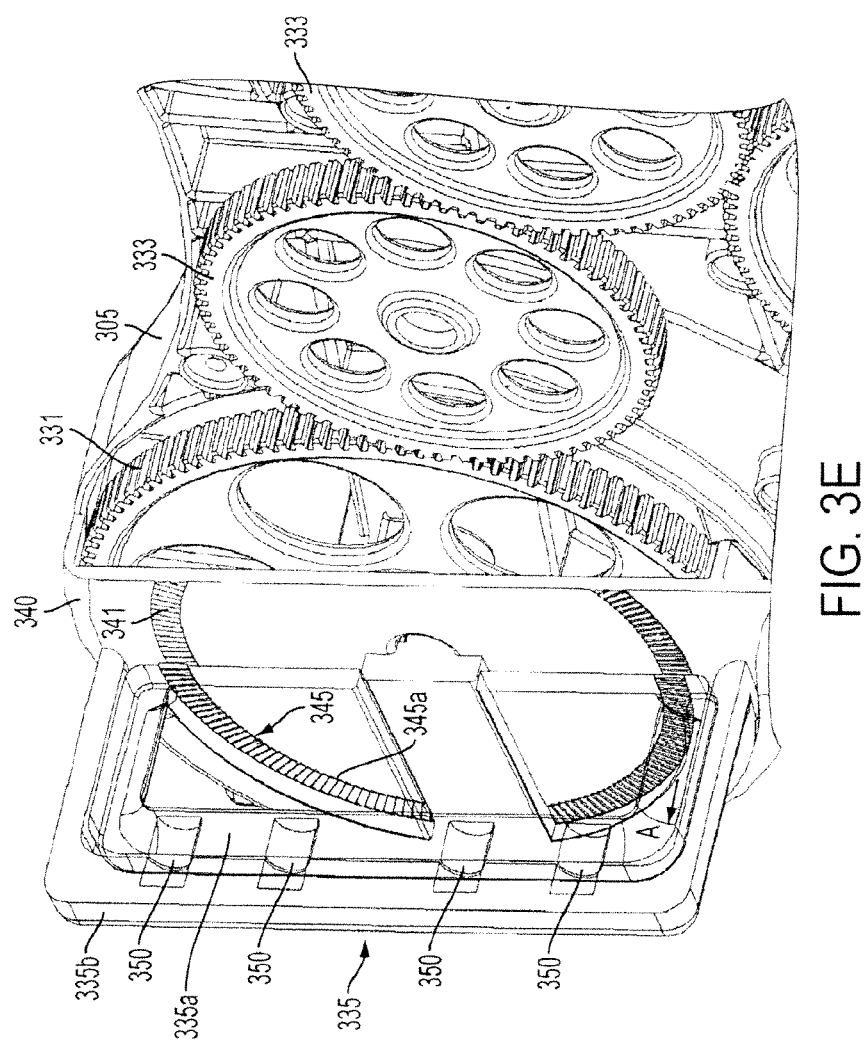

A cover 340 is attached to the clamp body 305 for covering the drive and connecting gears. Referring now to FIGS. 3D-E, the cover 340 has a first frictional surface, such as a first set of ratchet teeth 341. A second frictional surface, such as a ratchet ring 345 having a second set of ratchet teeth 345a, is attached to one of the handles 335 for engaging the first set of ratchet teeth 341. The ratchet ring 345 is attached to the handle 335 such that the ratchet ring 345 is constantly engaged with the handle 335 and selectively engaged with the first set of ratchet teeth 341. In the embodiment shown in FIGS. 3D-E, an inner portion 335a of the handle 335 carries the ratchet ring 345, and slides relative to an outer portion 335b of the handle 335 to selectively engage the first set of ratchet teeth 341.

When the first and second sets of ratchet teeth 341, 345 are not engaged, the handle 335 is rotatable to move the extendible arms 315 such that the gripping portions 320 of the extendible arms engage and grip the tire tread surface 205a and tighten the clamp 300 onto the tire 205, and when the first and second sets of ratchet teeth 341, 345 are engaged, the drive gears 331 are locked to prevent loosening of the clamp 300. Springs 350 are provided between the handle outer portion 335b and the second set of ratchet teeth 345a for biasing the second set of ratchet teeth 345a into engagement with the first set of ratchet teeth 341 when the handle 335 is not gripped by a user. When the handle 335 is gripped by the user, the first and second sets of ratchet teeth are not engaged. As shown in FIG. 3E, the inner portion of the handle 335a is slid in the direction of arrow A when the user grips the handle, thereby disengaging the ratchet teeth.

Figure 4A:
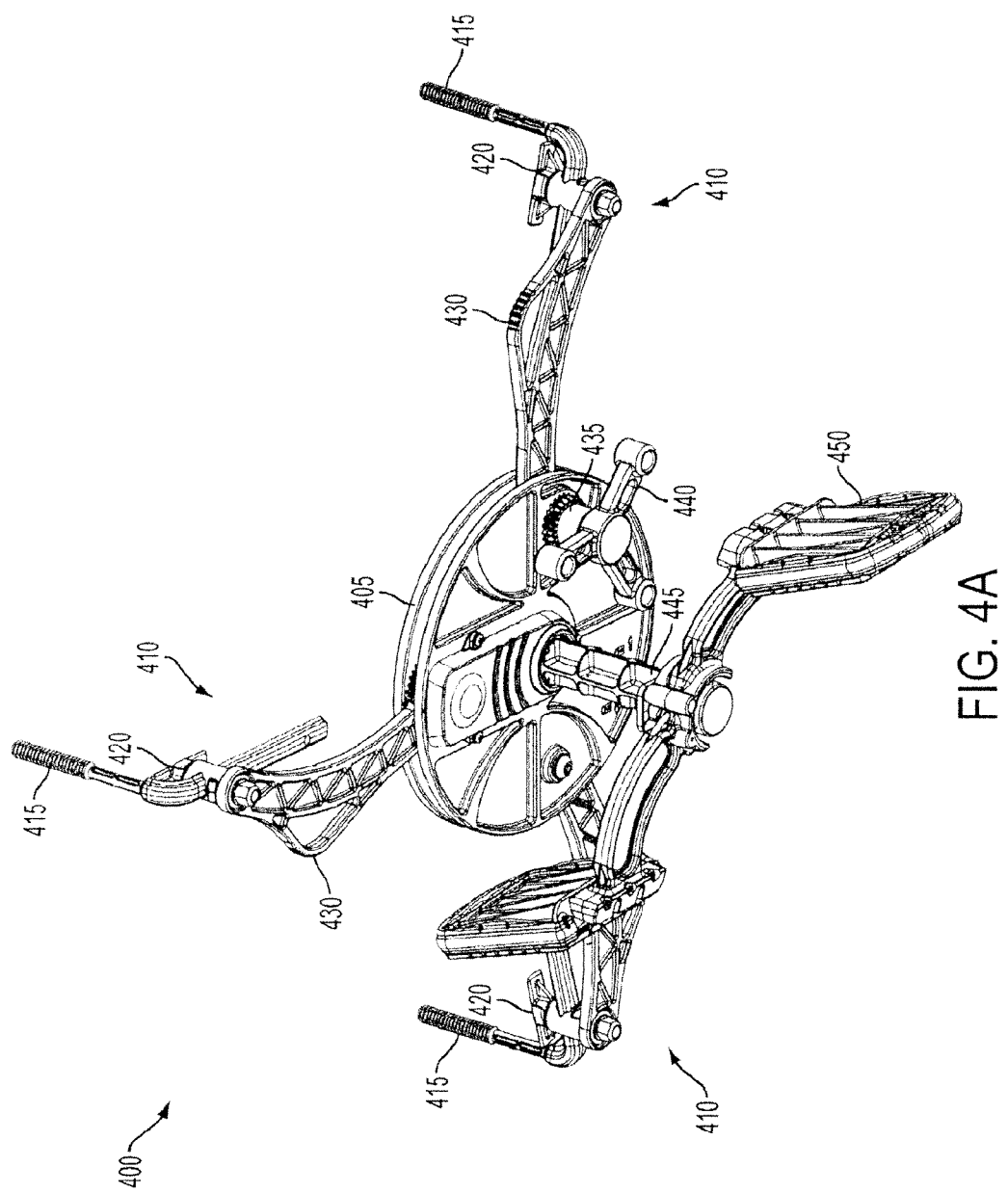
FIG. 4A is an external view of a wheel clamp according to a further embodiment of the present disclosure.
Figure 4B:
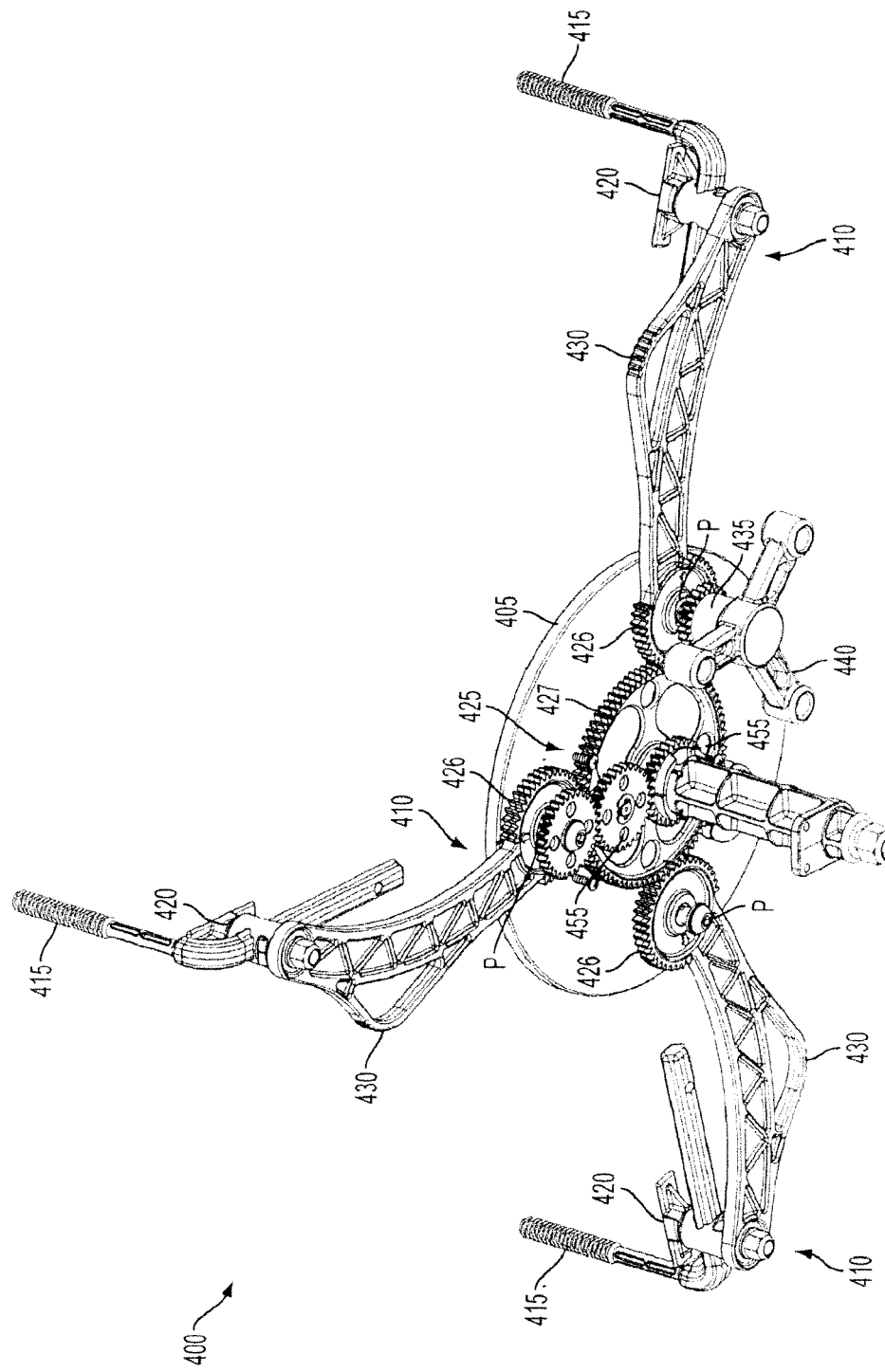
FIG. 4B is a cutaway view of the wheel clamp of FIG. 4A.

A further embodiment of the disclosed wheel clamp is shown in FIGS. 4A-B. This gear-driven design has arm gears as part of three pivotable arm assemblies. The arm gears engage with a central connecting gear that synchronizes the movement of each arm with respect to the others. Gripper arms are attached at the opposite end of the arm assemblies. The gripper arms are locked in similar relative positions to the arm assemblies to maintain self centering. The clamp is mounted by grasping the handles provided in the arm assemblies and rotating them until the clamp is secure against the vehicle tire. A ratchet device is provided to prevent loosening of the clamp after it has been pulled tight. In addition, an optional lock assist knob and mechanism are provided to apply additional clamping pressure beyond what was applied by the simple act of pushing inward and rotating the arm assemblies.

It is desirable that the target attached to the clamp remain in a constant orientation relative to the vertical arm assembly, so that the target will be visible (e.g., to aligner cameras) at any rotated angle of the horizontal arms. Position maintenance gears are therefore provided in this embodiment to link the movement of the vertical arm assembly to the target mounting spindle, so that the angular orientation is maintained constant.

A wheel clamp 400 according to this embodiment comprises a clamp body 405 and three elongated arms 410, each arm 410 having a proximal end pivotally mounted to the clamp body 405 such that the arm 410 extends outward from the clamp body 405. Clamp 400 is for mounting on a tire such as tire 205 shown in FIG. 2A. Each arm 410 has a distal end with a gripping portion 415 for gripping the tread surface 205a of the vehicle tire 205 and a sidewall contact portion 420 for contacting the sidewall 205b of the tire 205 when the gripping portion 415 is gripping the tire tread surface 205a. As in the previous embodiments of FIGS. 2A-F and 3A-E, the arms 410 are for spacing the wheel clamp 400 away from the wheel rim 240 when the gripping portions 415 are gripping the tire tread surface 205a and the sidewall contact portions 420 are contacting the tire sidewall 205b, such that the clamp body 405 is substantially parallel to the vehicle wheel and the wheel clamp 400 has no contact with the rim 240.

A self-centering mechanism 425 comprises an arm gear 426 attached to the proximal end of each of the arms 410 coaxial with the pivot point P of each respective arm 410, and a central connecting gear 427 engaged with all the arm gears 426 for synchronizing the movement of each arm 410 with respect to the other arms 410, such that when any of the gears are rotated, all the arms 410 simultaneously proportionally pivot relative to the clamp body 405. The self-centering mechanism 425 is for moving the arms 410 such that the gripping portions 415 engage and grip the tire tread surface 205a and tighten the clamp 400 onto the tire 205, while the sidewall contact portions 420 contact the tire sidewall 205b.

Each arm 410 comprises a handle 430 for grasping by a user such that when the user grasps two of the handles 430 and rotates two of the arms 410, the gripping portions 415 of all the arms engage and grip the tire tread surface 205a and tighten the clamp 400 onto the tire 205. A lock 435, such as a conventional ratchet mechanism selectively engagable with the central connecting gear 427, prevents rotation of the arm gears 426 and the central connecting gear 427 to prevent loosening of the clamp 400 after it has been tightened onto the tire 205. A lock assist knob 440 is attached to one of the arm gears 426 for rotating the arm gears 426 and the central connecting gear 427 for tightening the clamp 400 onto the tire 205.

The wheel clamp 400 also has a spindle 445 rotatably mounted to the clamp body 405 for supporting an apparatus (such as an optical target 450) used in performing the wheel alignment, and a set of position maintenance gears 455 for linking the movement of one of the arms 410 to movement of the spindle 445, for maintaining an angular orientation of the spindle 445 constant relative to the one of the arms 410.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A wheel clamp for attaching to a vehicle wheel for performing a wheel alignment on the vehicle, the wheel comprising a tire and a rim, the wheel clamp comprising:
   a clamp body for supporting an apparatus used in performing the wheel alignment;
   three extendable arms, each slidably mounted to the clamp body such that they extend outward radially from a central point, each extendable arm having a gripping portion for gripping a tread surface of the vehicle tire and a sidewall contact portion for contacting a sidewall of the tire when the gripping portion is gripping the tire tread surface; and
   a self-centering linkage mechanism comprising a plurality of gears rotatably mounted to the clamp body and engaged with each other, and a plurality of link arms, each link arm movably connecting one of the extendable arms to one of the gears such that when the gears are rotated, the extendable arms simultaneously proportionally slide relative to the clamp body;
   wherein the linkage mechanism is for moving the extendable arms such that the gripping portions of the extendable arms engage and grip the tire tread surface and tighten the clamp onto the tire, while the sidewall contact portions of the extendable arms contact the tire sidewall; and
   wherein the extendable arms are for spacing the wheel clamp away from the wheel rim when the gripping portions are gripping the tire tread surface and the sidewall contact portions are contacting the tire sidewall, such that the clamp body is substantially parallel to the vehicle wheel and the wheel clamp has no contact with the rim.

2. The wheel clamp of claim 1, wherein the linkage mechanism comprises:
   an orbital gear rotatably mounted to the clamp body; and
   a manually rotatable worm gear engaged with the orbital gear for rotating the orbital gear;
   wherein each link arm has a first end pivotably attached to the orbital gear and a second end pivotably attached to one of the extendable arms such that when the orbital gear is rotated by the worm gear, the link arms cause the extendable arms to slide relative to the clamp body.

3. The wheel clamp of claim 2, further comprising a knob attached to the worm gear for manually rotating the worm gear, and a clutch between the knob and the worm gear to limit a torque applied to the worm gear to a predetermined maximum torque when the wheel clamp is tightened onto the tire.

4. The wheel clamp of claim 2, wherein the clamp body has a plurality of slots, and the second ends of the link arms respectively engage and slide in the slots.

5. The wheel clamp of claim 1, wherein the clamp body is for supporting the apparatus used in performing the wheel alignment at the central point.

6. The wheel clamp of claim 1, wherein each of the extendable arms comprises:
   an arm support slidably mounted to the clamp body and movably attached to one of the link arms;
   a main arm including the gripping portion and the sidewall contact portion, adjustably mounted to the arm support for adjusting a length of the extendable arm.

7. The wheel clamp of claim 6, wherein the main arm is slidably mounted to the arm support in a telescoping manner, and the wheel clamp further comprises a lock for maintaining a position of the main arm relative to the arm support.

8. The wheel clamp of claim 7, wherein the lock comprises a ball detent mechanism between the main arm and the arm support.

9. The wheel clamp of claim 1, wherein a first one of the extendable arms is spaced more than 90 degrees clockwise from a second one of the extendable arms, and a third one of the extendable arms is spaced more than 90 degrees counter-clockwise from the second one of the extendable arms.

10. The wheel clamp of claim 2, further comprising a handle attached to the clamp body for gripping by a user for holding the clamp while the worm gear is manually rotated.

11. The wheel clamp of claim 10, wherein the handle is substantially vertical when gripped by a user, one of the extendable arms is proximal the handle, and each of two other of the extendable arms are offset more than 90 degrees from the one of the extendable arms, measured relative to the central point.

12. The wheel clamp of claim 1, wherein the linkage mechanism comprises:
   three drive gears rotatably mounted to the clamp body, each drive gear associated with one of the extendable arms and including a crank arm;
   a connecting gear train rotatably mounted to the clamp body and engaging all of the drive gears for synchronizing motion of the drive gears; and
   a handle attached to one of the drive gears for manually rotating the drive gears;
   wherein each link arm has a first end pivotably attached to an end of the crank arm of one of the drive gears, and a second end pivotably attached to one of the extendable arms, such that when the drive gears are rotated, the link arms cause the extendable arms to slide relative to the clamp body.

13. The wheel clamp of claim 12, comprising a second handle attached to a second one of the drive gears, for manually rotating the drive gears.

14. The wheel clamp of claim 12, further comprising:
   a cover attached to the clamp body for covering the drive and connecting gears, the cover having a first frictional surface;
   second frictional surface for engaging the first frictional surface, the second frictional surface being attached to the handle such that it is constantly engaged with the handle and selectively engaged with the first frictional surface;

wherein when the first and second frictional surfaces are not engaged, the handle is rotatable to move the extendable arms such that the gripping portions of the extendable arms engage and grip the tire tread surface and tighten the clamp onto the tire, and when the first and second frictional surfaces are engaged, the drive gears are locked to prevent loosening of the clamp.

15. The wheel clamp of claim 14, comprising a spring between the handle and the second frictional surface for biasing the second frictional surface into engagement with the first frictional surface when the handle is not gripped by a user;

wherein when the handle is gripped by the user, the first and second frictional surfaces are not engaged.

16. A wheel clamp for attaching to a vehicle wheel for performing a wheel alignment on the vehicle, the wheel comprising a tire and a rim, the wheel clamp comprising:

a clamp body;

three elongated arms, each arm having a proximal end pivotally mounted to the clamp body such that the arm extends outward from the clamp body, each arm having a distal end with a gripping portion for gripping a tread surface of the vehicle tire and a sidewall contact portion for contacting a sidewall of the tire when the gripping portion is gripping the tire tread surface; and a self-centering mechanism comprising an arm gear attached to the proximal end of each of the arms coaxial with the pivot point of each respective arm, and a central connecting gear engaged with all the arm gears for synchronizing the movement of each arm with respect to the other arms, such that when any of the gears are rotated, all the arms simultaneously proportionally pivot relative to the clamp body;

wherein the self-centering mechanism is for moving the arms such that the gripping portions of the arms engage and grip the tire tread surface and tighten the clamp onto the tire, while the sidewall contact portions of the arms contact the tire sidewall; and wherein the arms are for spacing the wheel clamp away from the wheel rim when the gripping portions are gripping the tire tread surface and the sidewall contact portions are contacting the tire sidewall, such that the clamp body is substantially parallel to the vehicle wheel and the wheel clamp has no contact with the rim.

17. The wheel clamp of claim 16, wherein each arm comprises a handle for grasping by a user such that when the user grasps two of the handles and rotates two of the arms, the gripping portions of all the arms engage and grip the tire tread surface and tighten the clamp onto the tire.

18. The wheel clamp of claim 16, comprising a lock for preventing rotation of the arm gears and the central connecting gear to prevent loosening of the clamp after it has been tightened onto the tire.

19. The wheel clamp of claim 18, wherein the lock comprises a ratchet mechanism selectively engageable with the central connecting gear.

20. The wheel clamp of claim 16, comprising a lock assist knob attached to one of the arm gears for rotating the arm gears and the central connecting gear for tightening the clamp onto the tire.

21. The wheel clamp of claim 16, comprising a spindle rotatably mounted to the clamp body for supporting an apparatus used in performing the wheel alignment, and a set of position maintenance gears for linking the movement of one of the arms to movement of the spindle, for maintaining an angular orientation of the spindle constant relative to the one of the arms.

22. The wheel clamp of claim 21, wherein the apparatus is a wheel alignment target.

23. The wheel clamp of claim 12, further comprising:

a cover attached to the clamp body for covering the drive and connecting gears, the cover having a first set of ratchet teeth;

a ratchet ring having a second set of ratchet teeth for mating with the first set of ratchet teeth, the ratchet ring being attached to the handle such that the ratchet ring is constantly engaged with the handle and selectively engaged with the first set of ratchet teeth;

wherein when the first and second set of ratchet teeth are not engaged, the handle is rotatable to move the extendable arms such that the gripping portions of the extendable arms engage and grip the tire tread surface and tighten the clamp onto the tire, and when the first and second set of ratchet teeth are engaged, the drive gears are locked to prevent loosening of the clamp.

24. The wheel clamp of claim 23, comprising a spring between the handle and the ratchet ring for biasing the second set of ratchet teeth into engagement with the first set of ratchet teeth when the handle is not gripped by a user;

wherein when the handle is gripped by the user, the first and second set of ratchet teeth are not engaged.

25. The wheel clamp of claim 10, wherein the handle comprises a level indicator for indicating when the handle is vertical.

26. A wheel clamp for attaching to a vehicle wheel for performing a wheel alignment on the vehicle, the wheel comprising a tire and a rim, the wheel clamp comprising:

a clamp body for supporting an apparatus used in performing the wheel alignment;

three extendable arms, each slidably mounted to the clamp body such that they extend outward radially from a central point, each extendable arm having a gripping portion for gripping a tread surface of the vehicle tire and a sidewall contact portion for contacting a sidewall of the tire when the gripping portion is gripping the tire tread surface; and a linkage mechanism comprising a plurality of gears rotatably mounted to the clamp body and engaged with each other, and a plurality of link arms, each link arm movably connecting one of the extendable arms to one of the gears such that when the gears are rotated, the extendable arms simultaneously slide relative to the clamp body;

wherein the linkage mechanism is for moving the extendable arms such that the gripping portions of the extendable arms engage and grip the tire tread surface and tighten the clamp onto the tire, while the sidewall contact portions of the extendable arms contact the tire sidewall; and wherein the extendable arms are for spacing the wheel clamp away from the wheel rim when the gripping portions are gripping the tire tread surface and the sidewall contact portions are contacting the tire sidewall, such that the clamp body is substantially parallel to the vehicle wheel and the wheel clamp has no contact with the rim.

* * * * *